US012572475B2

(12) United States Patent (10) Patent No.: US 12,572,475 B2
Palmer et al. (45) Date of Patent: Mar. 10, 2026

(54) COMPACT REPRESENTATION OF TRANSITION SEQUENCES FOR SINGLE-STATE STORAGE

(71) Applicant: International Business Machines Corporation, Armonk, NY (US)

(72) Inventors: Elaine R. Palmer, Hanover, NH (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 18/216,000

(22) Filed: Jun. 29, 2023

(65) Prior Publication Data

US 2025/0004946 A1 Jan. 2, 2025

(51) Int. Cl.
*G06F 21/57* (2013.01)
*G06F 12/0817* (2016.01)
*G06F 12/0864* (2016.01)

(52) U.S. Cl.
CPC ...... *G06F 12/0864* (2013.01); *G06F 12/0822* (2013.01); *G06F 21/577* (2013.01)

(58) Field of Classification Search
None
See application file for complete search history.

(56) References Cited

U.S. PATENT DOCUMENTS 6,467,088 B1 * 10/2002 alSafadi ................... G06F 8/65
717/173
9,488,979 B1 11/2016 Chambers et al.

11,025,430 B2 6/2021 Nandakumar et al.
11,140,134 B2 10/2021 Sinha et al.
11,153,160 B1 * 10/2021 Davis .................. H04L 41/0816
11,449,266 B2 9/2022 Hieb et al.
11,503,053 B2 11/2022 Zhang et al.
2008/0126354 A1 5/2008 Wang et al.
2014/0173137 A1 * 6/2014 Jacobson .............. H04L 45/021
709/248

(Continued)

FOREIGN PATENT DOCUMENTS

EP 4160980 A1 4/2023
WO 2025/003789 A1 1/2025

OTHER PUBLICATIONS

International Search Report and Written Opinion from PCT Application No. PCT/IB2024/055015, dated Jul. 5, 2024, 11 pages.

(Continued)

*Primary Examiner* — Joshua Joo

(74) *Attorney, Agent, or Firm* — Zilka-Kotab, P.C.

(57) ABSTRACT

A system-implemented (e.g., computer-implemented) method for generating a set of hashes representing known-good state sequences, in accordance with one aspect of the present invention, includes determining, a priori, all known-good state sequences of a system. Valid paths for the determined known-good state sequences are enumerated by constructing history-incorporating aggregate hashes that represent the states along the paths, whereby the resulting set of hashes represents all valid states as the system traverse through the known-good sequences. The history-incorporating aggregate hashes are stored. A state-advancing call is received from the system, and in response to receiving the call, the stored history-incorporating aggregate hashes are sent to the system.

18 Claims, 9 Drawing Sheets

(56) References Cited

U.S. PATENT DOCUMENTS

| | | | |
|---|---|---|---|
| 2018/0365272 A1* | 12/2018 | Sastry | G06F 16/2455 |
| 2019/0042794 A1* | 2/2019 | Serret-Avila | H04L 9/3236 |
| 2021/0099282 A1* | 4/2021 | Saxena | H04L 9/3239 |
| 2021/0286616 A1 | 9/2021 | Singh et al. | |
| 2023/0052790 A1* | 2/2023 | Albero | H04L 63/083 |
| 2023/0131250 A1 | 4/2023 | Koren et al. | |
| 2024/0005021 A1* | 1/2024 | Luciani, Jr. | G06F 21/64 |
| 2025/0219845 A1* | 7/2025 | Seidl | H04L 9/3247 |

OTHER PUBLICATIONS

Bertorello, A., "Hardware-Bound Virtual TPM for Cloud Computing Deep Attestation," Master Degree Thesis, Politecnino Di Torino, Jul. 2020, 112 pages.

Regenscheid, R., "Platform Firmware Resiliency Guidelines," NIST Special Publication 800-193, May 2018, 45 pages.

Huelsing et al., "XMSS: extended Merkle Signature Scheme," Internet Research Task Force, Request for Comments: 8391, May 2018, 74 pages.

Vinkler, A., "Immutable Snapshots—One of Git's Core Concepts," The Pragmatic Git, Aug. 14, 2021, 9 pages, retrieved from https://blog.git-init.com/immutable-snapshot-in-git/.

Microsoft, "Understanding PCR banks on TPM 2.0 devices," Microsoft 365, Dec. 9, 2022, 3 pages, retrieved from https://learn.microsoft.com/en-us/windows/security/information-protection/tpm/switch-pcr-banks-on-tpm-2-0-devices.

Bitcoinwiki, "Merkle tree," BitcoinWiki, 2022, 4 pages, retrieved from https://en.bitcoinwiki.org/index.php?title=Merkle_tree&oldid=384537.

* cited by examiner

100

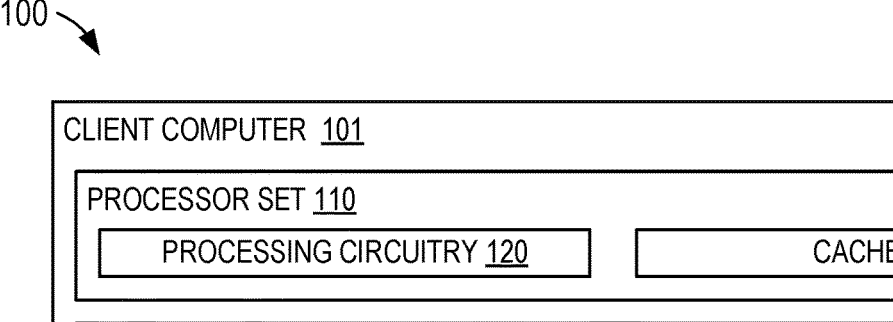

CLIENT COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

CODE FOR PROVIDING A COMPACT REPRESENTATION OF THE STATE OF A SYSTEM AND THE VALID TRANSITIONS ALLOWED IN THE SYSTEM

150

PERIPHERAL DEVICE SET 114

UI DEVICE SET 123

STORAGE 124

IoT SENSOR SET 125

NETWORK MODULE 115

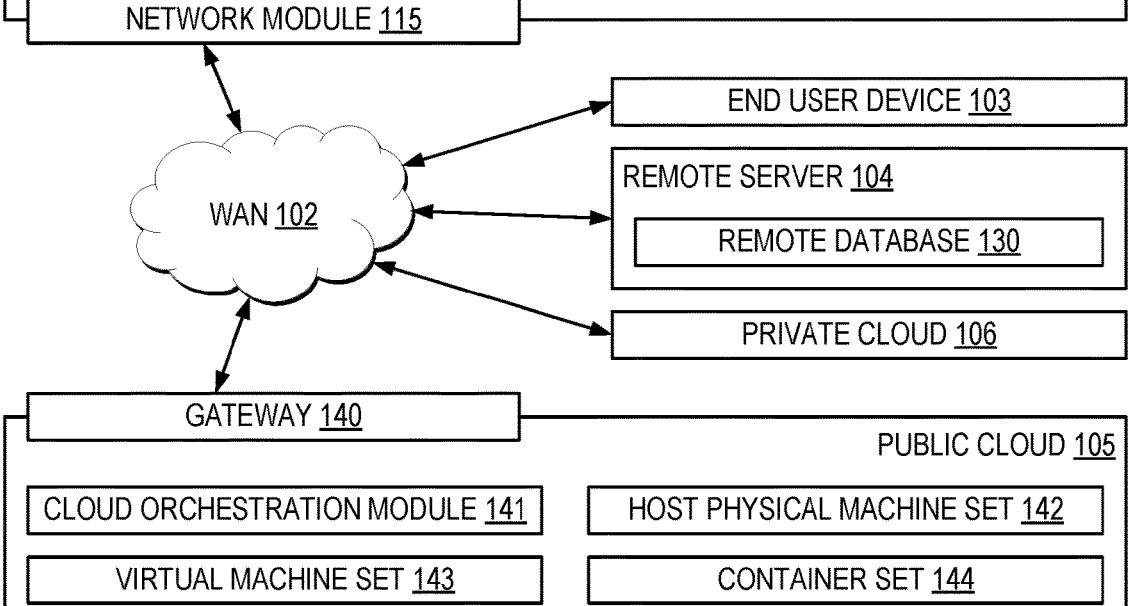

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

202  Determine known-good state sequences of a device

204  Enumerate valid paths for the determined known-good state sequences

206  Store the history-incorporating aggregate hashes

208  Receive a state-advancing call from a device

210  Send the stored history-incorporating aggregate hashes to the device

400

402 — Collect all valid sequences of states one may be expected to reach through any of the valid traversals 404 — Mark potentially valid terminal states using extended attributes of the tree structure 406 — Sort the set of leaf hashes to normalize the tree 408 — Construct the rest of the tree structure 410 — Save the tree structure

600

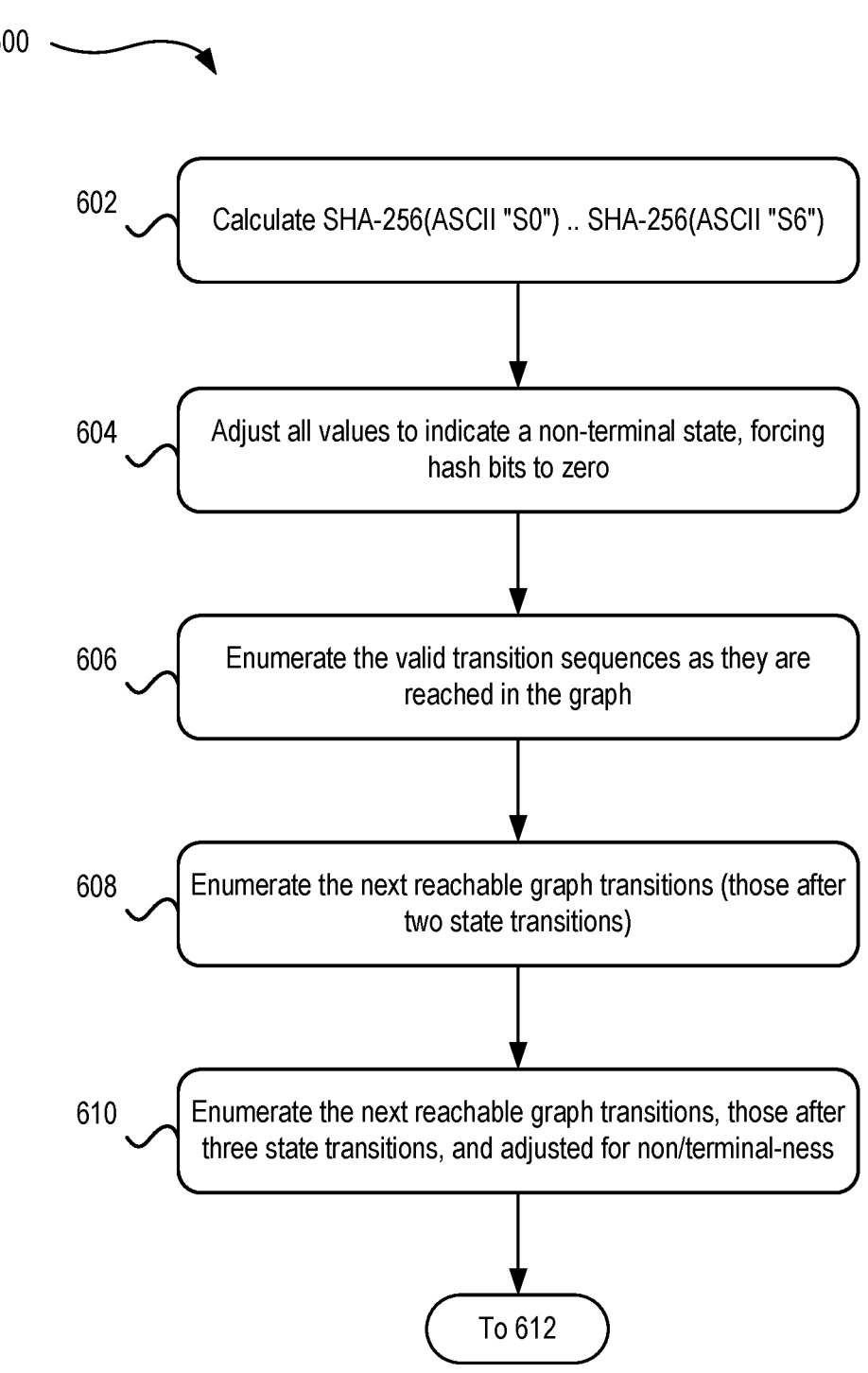

602     Calculate SHA-256(ASCII "S0") .. SHA-256(ASCII "S6")

604     Adjust all values to indicate a non-terminal state, forcing hash bits to zero 606     Enumerate the valid transition sequences as they are reached in the graph 608     Enumerate the next reachable graph transitions (those after two state transitions)

610     Enumerate the next reachable graph transitions, those after three state transitions, and adjusted for non/terminal-ness To 612

From 610

612   Enumerate the next reachable graph transitions, those after four state transitions, and adjusted for non/terminal-ness 614   Sort the list of the history-incorporating aggregate hashes, providing the full set of leaf hashes for the Merkle tree 616   Assemble the rest of the tree

COMPACT REPRESENTATION OF TRANSITION SEQUENCES FOR SINGLE-STATE STORAGE

BACKGROUND

The present invention relates to system security, and more specifically, this invention relates to protecting systems by providing a compact representation of the state of a system and the valid transitions the system may go through.

It is common practice to monitor the current configuration of systems. As used herein, the term "system" also includes subsystems and devices within systems, and may be a device, a computer, a cooperating device and computer, etc. The terms "system" and "device" are used interchangeably. The goal of monitoring is to determine whether the configuration of a system is in an acceptable or compliant state and to take remedial action if necessary. An example of such monitoring is to determine if the latest updates to software have been applied or if a system is running a vulnerable version of software.

Monitoring, however, has its limitations. Without additional data, a snapshot in time of the current configuration does not reflect the history of updates to the system. If the monitoring system does capture additional data, such as activity logs, the data can become quite large and difficult to analyze, and in some cases, it is buried within unbounded logs. Furthermore, if monitoring detects that a system is out of compliance, such as after a cyber-attack, the damage is already done.

Systems compliant with the U.S. Government's Platform Firmware Resiliency Guidelines, as specified by the National Institute of Standards and Technology (NIST) branch of the U.S. Department of Commerce, must implement three security and integrity principles: protect, detect, and recover. Monitoring systems for misconfigurations is one method of providing detection. Protection, however, seeks to prevent misconfigurations in the first place, before they become effective.

While monitoring can provide detection, it does not satisfy requirements for protection. To implement protection under the above-referenced NIST guidelines, the system must allow only valid transitions to a new state or configuration, and it must prevent invalid ones. For example, in an encryption device, a valid transition is to erase keys from the previous owner before adding keys for a new owner. An invalid transition is to add keys for a new owner before erasing the previous owner's keys. While simple transitions such as this example can be "hardwired" or programmed into firmware, valid sequences of events will change over time.

Attempted Solutions and their Drawbacks

Hardware Security Modules (HSMs)

HSMs are tamper-protected processing units which perform sensitive operations, such as protecting encryption operations, encrypting financial transactions, and verifying the firmware running inside the HSM. The data they protect is of extremely high value. Some users requiring very high security may want to prevent a transition from the original vendor's firmware verification keys to anyone else's keys. They also want to know the history of all such transitions.

Current HSMs cannot support this functionality. With limited programmability and storage inside the tamper-protected enclosure, they cannot prevent a successfully authenticated but invalid transition, and they can only report the most recent transition. Another problem is that HSMs may not be able to prevent rollback of firmware to a buggy or vulnerable version.

Sustainability and Circular Economy

When data center equipment reaches a certain stage in its lifecycle, it is either scrapped, salvaged, or sold for reuse. If the equipment contains an owner's firmware verification keys, there is no simple and secure way to erase or replace the keys prior to decommission and resale of thousands of systems. Buyers may want to install their own keys, but that operation typically must be authorized by the seller or original vendor of each unique device. There is no infrastructure for making these ownership transitions at scale. Currently, equipment that contains the owner's firmware verification keys must be scrapped, which is an unsustainable solution.

Telecommunications and Satellites

Cellular network providers operate hundreds of thousands of small servers to support their networks. Although these systems are behind locked doors, they are still vulnerable to physical and logical attacks. Initial setup and remote support are often provided by companies such as RedHat. Once initialized, these systems support remote system updates and monitoring. The systems are configured as "appliances," meaning that many thousands of them have identical hardware, firmware, and software. If someone installs unauthorized software on a system, it may only be detected after the fact. Detecting the attack would involve processing system logs and looking for anomalies as compared to databases of permissible software. Satellites operate in a similar manner in that they have limited resources, and they need to protect rather than detect unauthorized software updates.

Trusted Platform Modules (TPMs) and Integrity Measurement Architecture (IMA)

The integrity subsystem of the Linux kernel monitors individual files for unauthorized changes. It notifies a TPM to maintain a cumulative hash of files that were executed and opened (among other file operations). IMA can prevent unauthorized changes to individual files, but it cannot identify illegal operations across multiple files. For example, it cannot prevent fifty-six files from running to bring up a network when only fifty were supposed to run.

SUMMARY

Various aspects of the present invention provide a practical way to comply with the aforementioned NIST principles. In such aspects, permissible transitions are updated without a major rewrite of the firmware. Additionally, the permissible transitions are provided in a compact representation, e.g., via one or more hashes or equivalently some other compact representation(s), that easily fits in systems (e.g., devices) with limited resources, efficiently encodes the state transitions, and takes very little time to transmit. These benefits reduce hardware requirements on such systems e.g., by reducing the required amount of memory, as well as improve computer efficiency and reduce processing requirements and transmission bandwidth due to the small size of the hashes.

Moreover, some aspects of the present invention overcome the limitations in HSMs by enabling restriction of state changes to certain transitions, and the ability to report the entire history from within a resource-constrained system.

In addition, some aspects of the present invention support sustainability. By implementing such aspects, the equipment can support multiple ownership transitions without the need to destroy the equipment, thereby creating electronic waste.

Further, by implementing some aspects of the present invention, a remote system can prevent unauthorized configuration transitions at the time they are attempted, rather than simply detecting them after the fact. This feature is particularly useful in telecommunications and satellite systems, among many others.

Still further, by implementing some aspects of the present invention, subsystem configurations can be enforced across files.

Some or all of the foregoing benefits are enabled by the following methods.

A system-implemented (e.g., computer-implemented) method for generating a set of hashes representing known-good state sequences, in accordance with one aspect of the present invention, includes determining, a priori, all known-good state sequences of a system. Valid paths for the determined known-good state sequences are enumerated by constructing history-incorporating aggregate hashes that represent the states along the paths, whereby the resulting set of hashes represents all valid states as the system traverses through the known-good sequences. The history-incorporating aggregate hashes are stored. A state-advancing call is received from the system, and in response to receiving the call, the stored history-incorporating aggregate hashes are sent to the system.

A system-implemented method for verifying whether a state transition is allowed and/or valid, in accordance with one aspect of the present invention, includes, in response to receiving a request to transition to a new state, requesting a set of history-incorporating aggregate hashes. The history-incorporating aggregate hashes are received. An evaluation is performed, within the system, as to whether to transition to the new state by: calculating a hash for the requested new state, comparing the calculated hash to the received history-incorporating aggregate hashes, and allowing the transition to the new state in response to determining that the calculated hash matches one of the history-incorporating aggregate hashes, else not allowing the transition to the new state in response to determining that the calculated hash does not match one of the history-incorporating aggregate hashes.

A computer program product, in accordance with one aspect, includes one or more computer readable storage media, and program instructions collectively stored on the one or more computer readable storage media. The program instructions include program instructions to perform any combination of the foregoing methodology.

A system, in accordance with one aspect, includes a processor, and logic integrated with the processor, executable by the processor, or integrated with and executable by the processor. The logic is configured to perform any of the foregoing methodology.

Other aspects of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one aspect of the present invention.

DETAILED DESCRIPTION

Figure 2A:
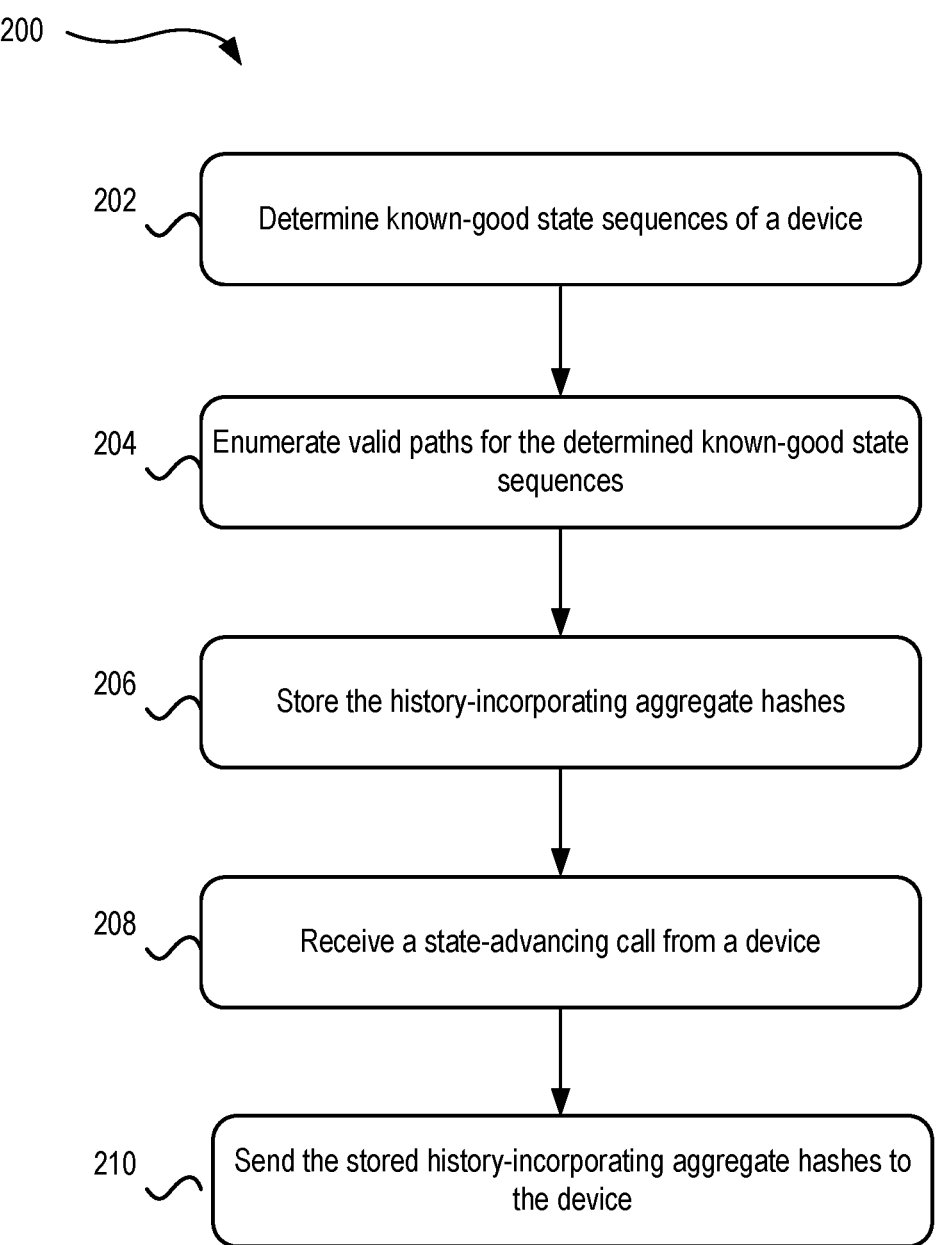
FIG. 2A is a flowchart of a method for generating a set of hashes representing known-good state sequences, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred systems, methods and computer program products for protecting systems by providing a compact representation of the state of a system and the valid transitions it may go through. Using this representation, a system can prevent invalid transitions before they happen. Additionally, this compact representation facilitates efficient detection of misconfigurations. Moreover, if the list of permitted transitions must be changed, the representation of valid transitions is simply replaced, preferably through an authenticated operation.

In one general approach, a system-implemented (e.g., computer-implemented) method for generating a set of hashes representing known-good state sequences includes determining, a priori, all known-good state sequences of a system. Valid paths for the determined known-good state sequences are enumerated by constructing history-incorporating aggregate hashes that represent the states along the paths, whereby the resulting set of hashes represents all valid states as the system traverses through the known-good sequences. The history-incorporating aggregate hashes are stored. A state-advancing call is received from the system, and in response to receiving the call, the stored history-incorporating aggregate hashes are sent to the system.

The system (e.g., device of the system) may then use the history-incorporating aggregate hashes to determine whether to allow a state change. If the system calculates a hash for the state change that does not match a corresponding one of the history-incorporating aggregate hashes, then the state change can be prevented before it occurs. Thus, security of the system is enhanced because an invalid and thus potentially nefarious state change is prevented from happening altogether.

Moreover, by storing the set of hashes in external memory, permissible transitions may be updated without a major rewrite of the firmware. Additionally, the permissible transitions are provided in a compact representation, e.g., via one or more hashes or equivalently some other compact representation(s), that easily fits in systems (e.g., devices) with limited resources, efficiently encodes the state transitions, and takes very little time to transmit. These benefits reduce hardware requirements on such systems e.g., by reducing the required amount of memory, as well as improve computer efficiency and reduce processing requirements and transmission bandwidth due to the small size of the hashes.

In a preferred approach, the history-incorporating aggregate hashes are stored in a tree structure, such as a Merkle tree structure. A tree structure provides a simple and accurate way to represent the history-incorporating aggregate hashes.

The tree structure may be normalized, such as by sorting its lowest-level nodes, so that tree construction is deterministic (and identical state machines' encoding will also be identical). Said another way, this normalization ensures that identical state machines are encoded as the same tree.

In some approaches, the history-incorporating aggregate hashes representing terminal states are specially marked. This is especially useful to identify those hashes as being associated with a terminal state. This allows the system to unambiguously exit from state-sequence traversal.

In one approach, at least some of the history-incorporating aggregate hashes are constructed by sequentially combining hashes for states along the respective paths, e.g., by hashing leaves in the tree that are at the same level. This has the effect of encoding in and distinguishing the different paths that may be taken to reach a particular state.

One approach includes adding a second hash-sized register to the system e.g., by allocating a portion of existing persistent memory to the second register, by adding persistent memory for the second register, etc. Adding the second hash-sized register allows traversal through one of offline-enumerated states regardless of the number of valid paths from the current starting state, as describe in more detail below.

A computer program product for generating a set of hashes representing known-good state sequences, in accordance with one aspect, includes one or more computer readable storage media, and program instructions collectively stored on the one or more computer readable storage media. The program instructions include program instructions to perform any combination of the foregoing methodology.

A system, in accordance with one aspect, includes a processor, and logic integrated with the processor, executable by the processor, or integrated with and executable by the processor. The logic is configured to perform any of the foregoing methodology.

A system-implemented method for verifying whether a state transition is allowed and/or valid includes, in response to receiving a request to transition to a new state, requesting a set of history-incorporating aggregate hashes. The history-incorporating aggregate hashes are received. An evaluation is performed, within the system, as to whether to transition to the new state by: calculating a hash for the requested new state, comparing the calculated hash to the received history-incorporating aggregate hashes, and allowing the transition to the new state in response to determining that the calculated hash matches one of the history-incorporating aggregate hashes, else not allowing the transition to the new state in response to determining that the calculated hash does not match one of the history-incorporating aggregate hashes.

By using the history-incorporating aggregate hashes to determine whether to allow a state change, if the system calculates a hash for the state change that does not match a corresponding one of the history-incorporating aggregate hashes, then the state change can be prevented before it occurs. Thus, security of the system is enhanced because an invalid and thus potentially nefarious state change is prevented from happening altogether.

Additionally, the permissible transitions are provided in a compact representation, e.g., via one or more hashes or equivalently some other compact representation(s), that easily fits in systems (e.g., devices) with limited resources, efficiently encodes the state transitions, and takes very little time to transmit. These benefits reduce hardware requirements on such systems e.g., by reducing the required amount of memory, as well as improve computer efficiency and reduce processing requirements and transmission bandwidth due to the small size of the hashes.

This method may overcome the limitations in HSMs by enabling restriction of state changes to certain transitions, and the ability to report the entire history from within a resource-constrained system.

In addition, this method may support sustainability. By implementing such aspects, the equipment can support multiple ownership transitions without the need to destroy the equipment, thereby creating electronic waste.

In one approach, the history-incorporating aggregate hashes are received as a tree structure, such as a Merkle tree. A tree structure provides a simple and accurate way to represent the history-incorporating aggregate hashes.

Preferably, the tree structure is only retained as a transient copy within the system. Thus, the persistent storage requirements of the system are greatly reduced.

In one approach, the system stores only a root of the tree structure persistently. Because the rest of the tree structure can be retrieved from a remote location, the persistent storage required on the system for the root is minimal.

In one approach, the hash for the requested new state is generated using a hash for a current state and an expected state of the system after transitioning to the new state. The resulting hash for the requested new state can then be compared to the received history-incorporating aggregate hashes to determine if the transition to the new state is allowed.

One approach includes replacing, in a persistent register, a hash for a current state of system with the calculated hash for the new state in response to transitioning to the new state. In this way, the system stores a representation of the current state of the system, which can be used when the next call for a change in state is made.

In one approach, the calculated hash is replaced with a hash of the final state reached in response to execution in a state machine being terminated in the system. This final state may become the initial state hash (SO) for use in the next execution of state machine.

Preferably, the calculated hash is stored in a second persistent register. Adding the second hash-sized allows traversal through one of offline-enumerated states regardless of the number of valid paths from the current starting state, as described in more detail below.

In one approach, the history-incorporating aggregate hashes are in a form of a Merkle tree, and at least a hash identifying a current state of the system is used to generate the calculated hash. The calculated hash is compared to values in the Merkle tree to determine whether the requested state transition matches a valid state transition sequence of the Merkle tree. A tree structure such as a Merkle tree provides a simple and accurate way to represent the history-incorporating aggregate hashes. Moreover, by using the hash identifying a current state of the system, which itself may be a history-incorporating aggregate hash stored in response to the transition to the present state, fewer calculations need be performed.

A computer program product for verifying whether a state transition is allowed and/or valid, in accordance with one aspect, includes one or more computer readable storage media, and program instructions collectively stored on the one or more computer readable storage media. The program instructions include program instructions to perform any combination of the foregoing methodology.

A system, in accordance with one aspect, includes a processor, and logic integrated with the processor, executable by the processor, or integrated with and executable by the processor. The logic is configured to perform any of the foregoing methodology.

Various aspects of the present disclosure are described by narrative text, flowcharts, block diagrams of computer systems and/or block diagrams of the machine logic included in computer program product (CPP) aspects. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

Exemplary Computer Environment for System (e.g., Device) or Portion Thereof

A computer program product aspect ("CPP aspect" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for providing a compact representation of the state of a system and the valid transitions allowed in the system in block 150. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

Overview

High-assurance systems which manage configurations may use cryptographic hashes as compact, unambiguous representations of full-system state. Data structures featuring hashes can safely encode state of arbitrary-sized systems in small, fixed-sized fields. However, a device capable of storing only a singular state cannot store additional fields for things such as (lists of) specific sequences of states. Various approaches described herein enable creation of such lists, thereby enabling such things as describing multiple traversal paths through a collection of states, or for use in other multi-valued situations.

One of the aforementioned lists may be useful if, for example, a system needs to describe multiple traversal paths through a collection of states, or other multi-valued situations. For example, assume a remotely managed system (device) is initially provisioned with cryptographic key A. Later, the system receives a new key B. In the current state of the art, the device cannot determine whether it should trust and install new key B. Moreover, what if key B is revoked in the future? Key B may either be replaced with a new key C or rolled back to key A, the most recent "known good" key. At the beginning, valid transitions are A->B and B->C, and B->A. Assuming that after key B is revoked, a transition to key B should never be allowed again, the transition A->B is no longer valid. In some cases, it may be important to include a history of having made the transition A->B, because the device may have spent time under the control of an attacker using key B. Keeping track of all valid and past transitions has heretofore typically been impossible in devices with limited resources.

As will soon become apparent, systems configured as presented herein may now evolve through sequences of known states, which may be a priori enumerated offline, even if the actual path taken might become known only at runtime. A particularly important application enabled by the methodology described herein is describing all valid state-transition sequences from a specific state to ensure only one of the a priori known sequence of transitions is followed. Various aspects provide a scalable solution to restricting transaction sequences to pass through known-good sequences, while adding only a constant number of bits, regardless of sequence-set size.

In addition, a minimal additional field (another hash) and compact external data structures may securely and unambiguously encode all valid paths through known sets of states. Because only one additional hash field plus several attribute bits is added to persistent storage, and transient storage is used for [external] data structures which scale with the number of possibilities, systems in accordance with the methodology presented herein may be easily implemented in devices having small storage space. Moreover, various approaches are particularly amenable to implementation in devices in which a hash-based data structure is already available.

Single-Valued Cryptographic Hashes

In some approaches, a system (e.g., device) is already configured to represent state as a single-valued hash field. Such cryptographically sound representations of state (history) are known in the art, e.g., git, Trusted Platform Module: Platform Configuration Register (TPM: PCR), etc. The system is then modified according to the teachings herein. In preferred approaches, a single hash-sized register is added to allow traversal through one of the offline-enumerated states, regardless of the number of valid paths from the current starting state.

In other approaches, the system may be modified to represent both the state as a single-valued hash field, as well as add the additional register. The system may be programmed to provide this functionality, etc.

Description of Valid State Transitions

Assuming the system is already configured to represent state as a single-valued hash field, this single-valued case is extended to traversal through an offline-enumerated state machine, where all possible (allowed or valid) transitions are a priori known, but the extract path taken is not decided before runtime. An auxiliary, non-malleable structure is constructed to represent all valid sequences from the then-current state, with some or all of the following properties:

1. In some approaches, the structure may be unambiguously identified by a single cryptographic hash, such as a hierarchical, normalized tree structure with a single top-level hash. The structure itself aggregates a number of individually computed hashes. Representing the set of valid paths, the hash of the entire tree structure is registered to describe valid transitions.

2. In some approaches, the structure is not sensitive. It can be safely assumed that hashing has obscured original inputs, and the structure may be retained in untrusted media. The integrity of the external data structure, as identified by its top-level hash, is validated with each call. In preferred approaches, only transient copies are used during command evaluation within the device; only external storage retains the entire structure persistently.

3. In some approaches, the structure may be efficiently traversed, particularly when checking for the presence/absence of a particular subordinate hash. Typically, 0 (log (N)) asymptotic complexity is expected for N hashes (which may be accomplished using hash trees). Other than verifying tree consistency, one can expect to perform exactly two lookups to evaluate each before-after state pair.

4. In some approaches, given a top-level hash, the structure is immutable, in that one may unambiguously verify that the structure corresponds to a particular top-level hash. For example, because we use a cryptographic hash function, attempting to construct a different structure with the same top-level hash is considered infeasible.

5. In some approaches, the structure is built from all valid system-state hashes that may be encountered during any of the safe transitions, and no other hash. Checking for transition validity amounts to checking for both current and expected-next state hash in the structure; absence of either state implies deviation from all of the accepted sequences.

6. In some approaches, the structure needs to mark valid terminal states, to allow the device unambiguous exit from state-sequence traversal.

A well-known data structure, Merkle trees [MRK], possess these characteristics if it is extended by the capability to mark terminal states. The applicability is described below in detail. Other data structures may also be used, in other approaches.

Combining Current State and Past History into Hash Fields

To encode the specific sequence of states the system is expected to pass through, structure which appends or otherwise combines two hashes to create an updated state is preferably used.

In some approaches, a construct typically used by TPM hash registers (PCRs) where hashes are simply concatenated and hashed again [TPM: PCR] may be used. Other comparable schemes may be similarly used in various approaches.

Exemplary Processes

Now referring to FIG. 2A, a flowchart of a method 200 for generating a set of hashes representing known-good state sequences is shown according to one approach. The method 200 may be performed in accordance with the present invention in any of the environments depicted in FIG. 1, among others, as well as with any combination of features from the exemplary architecture and exemplary approaches described in detail below, in various approaches. Of course, more or fewer operations than those specifically described in FIG. 2A may be included in method 200, as would be understood by one of skill in the art upon reading the present descriptions.

Each of the steps of the method 200 may be performed by any suitable component of the operating environment. For example, in various approaches, the method 200 may be partially or entirely performed by a system such as a computer, or some other device having one or more processors therein. The processor, e.g., processing circuit(s), chip (s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2A, method 200 may initiate with operation 202, where known-good state sequences of a device are a priori determined. Preferably, all known-good state sequences are generated.

In operation 204, valid paths for the determined known-good state sequences are enumerated by constructing history-incorporating aggregate hashes that represent the states along the paths. The resulting set of hashes represents all valid states as one traverses through the known-good sequences. The history-incorporating aggregate hashes are constructed by sequentially combining hashes for states along the respective paths. Procedures for, and examples of, constructing history-incorporating aggregate hashes are presented in detail below.

In operation 206, the history-incorporating aggregate hashes are stored. Preferably, the hashes are stored in a known data structure. Particularly preferred are tree structures, such as a Merkle tree.

In operation 208, a state-advancing call is received from the device.

In operation 210, in response to receiving the call, the stored history-incorporating aggregate hashes are sent to the device. The device may then use the history-incorporating aggregate hashes to determine whether to allow a state change. If the device calculates a hash for the state change that does not match a corresponding one of the history-incorporating aggregate hashes, then the state change can be prevented before it occurs. Thus, security of the device is enhanced because an invalid and thus potentially nefarious state change is prevented from happening altogether.

Figure 2B:
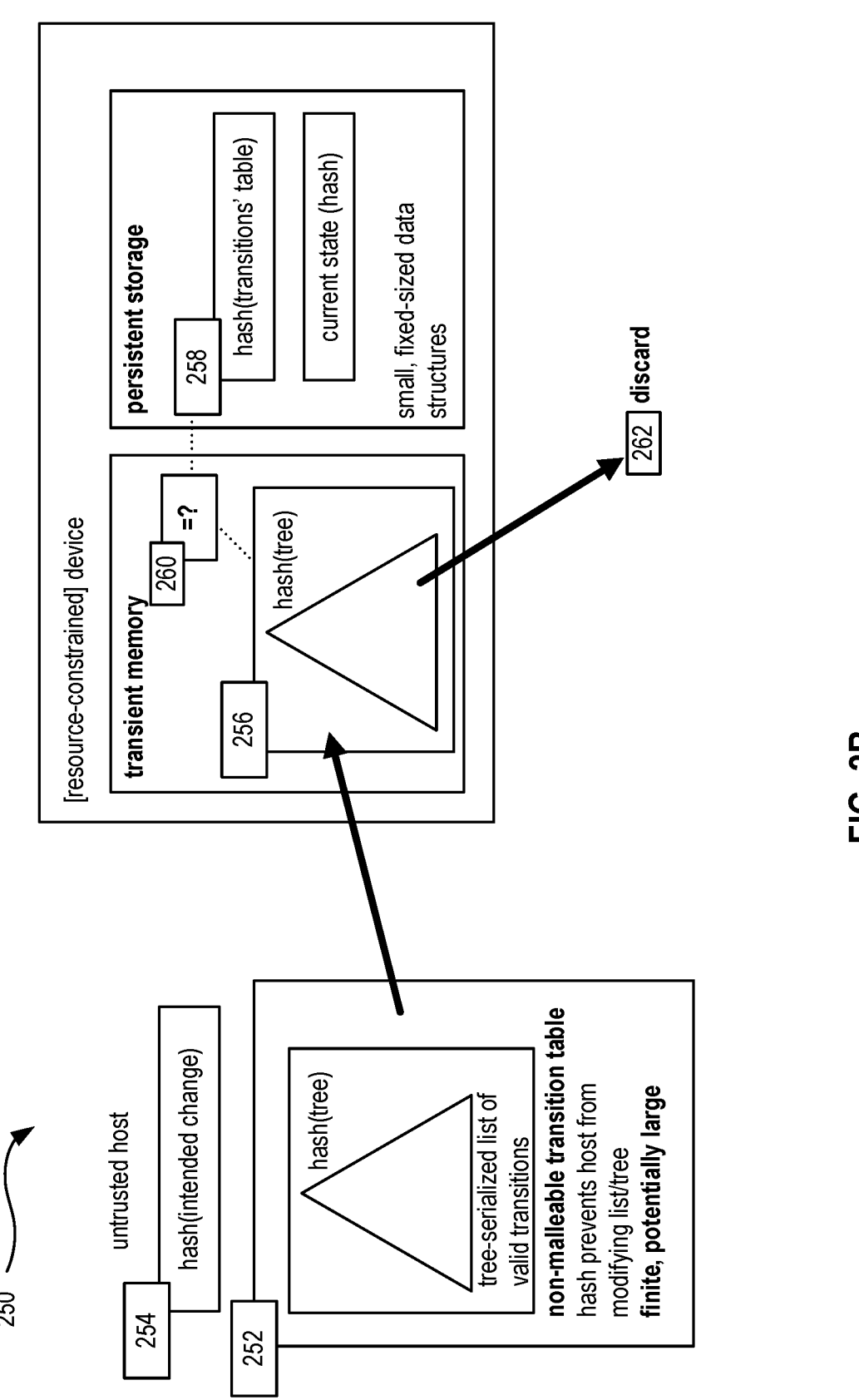
FIG. 2B is a device-centric representation of a process, in accordance with one approach.
Figure 3:
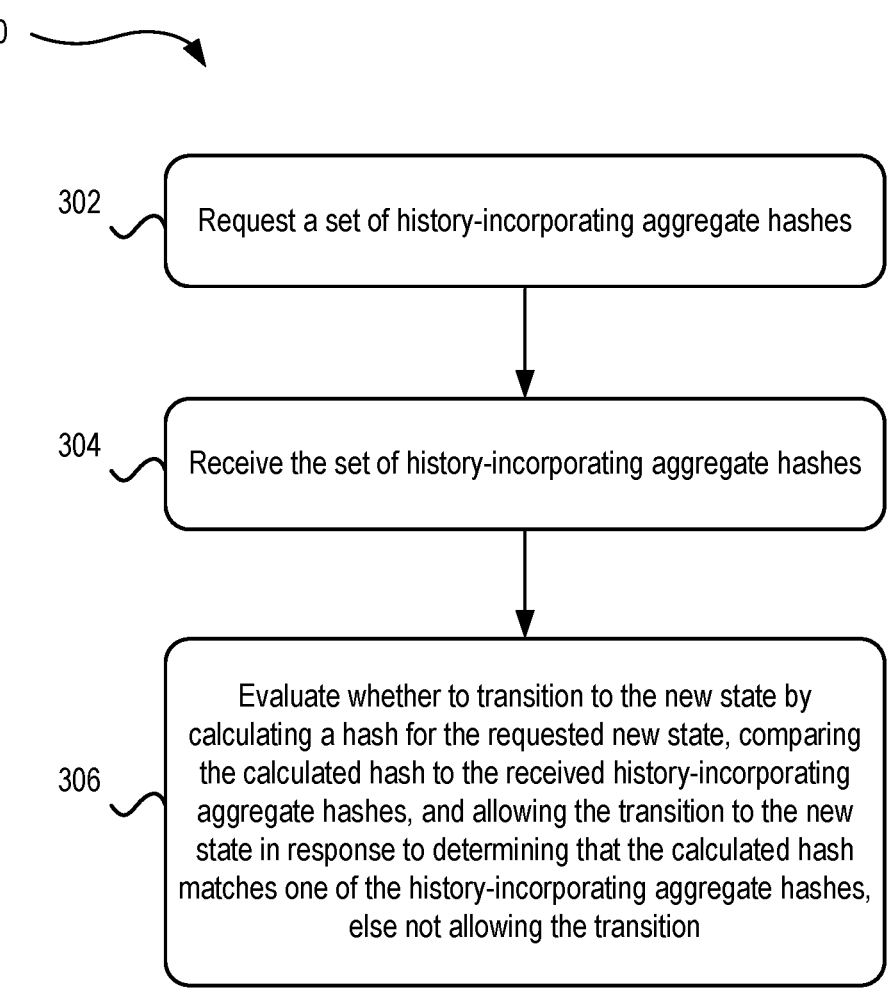
FIG. 3 is a flowchart of a method for verifying whether a state transition is allowed and/or valid, in accordance with one approach.

FIG. 2B depicts a device-centric representation 250 of a process including the transition from generating the set of hashes, e.g., as in the method of FIG. 2A, to using the hashes, e.g., as in the method of FIG. 3 for verifying whether a state transition is allowed and/or valid, in accordance with a preferred aspect.

FIG. 2B particularly demonstrates how transient vs. persistent state is preferred in some approaches—specifically, that by affording redundantly used and disposable per-request data, only negligible amounts of persistent memory is needed in preferred approaches. As shown, the system includes a host, which may be untrusted, and a device, e.g., a resource-constrained device having transient memory and persistent memory.

With continued reference to FIG. 2B, at 252, the host maintains an entire state-transitions' tree (struct) remote from the device. The tree (struct) is non-malleable even though stored outside devices. The device preferably maintains the expected overall hash at 258, so the host may not replace the struct. Due to the non-malleability, there is no need to persistently retain any related struct, other than the current hash at 258 plus the hash of the table that is currently trusted.

At 254, each state-changing operation sends in the intended next state (ID/hash), and attaches the tree structure to it.

At 256, depending on the implementation, the device may have enough transient internal storage to store throwaway copies during each call, or a streaming-capable structure may be used if even transient memory is limited. Either way, only small fixed-sized persistent structures are needed at 256. Transient storage is considerably less problematic even in small devices.

When processing requests, the comparison at 260 always checks the expected/known-good hash (258) vs. that of the transient copy (256), and rejects the tree and the entire request if they do not match.

Regardless of how the request terminates, any request-attached transient data may be discarded at 262 after completion.

The representation 250 of FIG. 2B highlights specifically which elements are small, and which scalable-sized structures are only transiently used in the illustrated preferred approach. Thus, regardless of state-table size, within reason, resource needs on small devices are still not prohibitive.

Now referring to FIG. 3, a flowchart of a method 300 for verifying whether a state transition is allowed and/or valid is shown according to one approach. The method 300 may be performed in accordance with the present invention in any of the environments depicted in FIGS. 1-2A, among others, as well as with any combination of features from the exemplary architecture and exemplary approaches described in detail below, in various approaches. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a system (device) having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where, in response to receiving a request to transition to a new state, a set of history-incorporating aggregate hashes is requested.

In operation 304, the history-incorporating aggregate hashes are received.

In operation 306, an evaluation is made, within the device, as to whether to transition to the new state by the following submethod: calculating a hash for the requested new state, comparing the calculated hash to the received history-incorporating aggregate hashes, and allowing the transition to the new state in response to determining that the calculated hash matches one of the history-incorporating aggregate hashes, else not allowing the transition to the new state in response to determining that the calculated hash does not match one of the history-incorporating aggregate hashes.

Exemplary Architecture

Some or all of the following exemplary architecture may be used to configure a system or systems to implement the methods 200 and 300 of FIGS. 2 and 3, according to various aspects of the present invention. Moreover, various features described in this section may be used in and/or added to the methods 200 and 300 of FIGS. 2 and 3, as will become apparent to one skilled in the art upon reading the present disclosure.

In some approaches, combining the properties of known-good state enumeration, a system may be implemented by including one or more, and preferably all, of the following additions to a system (e.g., devices) modified to process, or already capable of processing, state hashes.

Systems which can represent state in a compact, cryptographically secure format, such as a cryptographic hash, are extended to also use a list of allowed state transitions. This additional data structure may be used to place a restriction on the evolution of states, including defining valid sequences of states. See, e.g., operation 202 of FIG. 2A.

An additional, hash-sized register is added to the device, to mark positions where the system is expected to traverse through one of known-good state sequences. Thus, in addition to the register in the device for storing a state-identifying singular hash, an additional hash-sized register is added to indicate that transitions are passing through a predefined state machine (and no other sequence, including invalid combinations of otherwise valid states in the state machine). Other than the additional hash-sized register, no other persistent structure is needed to describe the data describing allowed transitions.

This second hash-sized register may be added to the device via any known technique, such as by allocating a portion of existing persistent memory to the second register, by adding physical persistent memory to the device for the second register, etc.

For each set of known-good state sequences, all valid paths are enumerated, preferably by constructing history-incorporating aggregate hashes. Examples of combining states into a history-incorporating aggregate hash are presented below. Each set of such hashes represents all valid states as one traverses through known-good sequences; any other state hash corresponds to unintended, and therefore incorrect, hashes. See also operation 204 of FIG. 2A.

Note that auxiliary attributes may be added to the tree to mark specific entries as valid terminal states, as noted below. For example, states which are also valid terminal states are specially marked. Examples of such special marking are presented below.

All of the history-incorporating aggregate hashes representing the valid histories are entered into a single data structure, preferably a tree structure. The tree structure may be normalized, such as by sorting its lowest-level nodes, so that tree construction is deterministic (and identical state machines' encoding will also be identical).

The tree structure which describes the state machines is stored, and may be published. See, e.g., operation 206 of FIG. 2A.

When the system evolution is to be presented with a choice of known-good sequences, the hash of the entire tree structure is stored to represent the state machine. The tree structure is stored in external memory, ready to be provided to the device with each state-advancing call. Accordingly, the tree structure may be stored on a computer remote from the device, in the cloud, in an external memory coupled to the device, etc. See, e.g., operations 208-210 of FIG. 2A and operations 302-304 of FIG. 3.

Each potential state change is evaluated within the device, preferably by considering then-current state, the expected new state (after the current requested change would be applied), and the tree structure which encodes valid sequences. See, e.g., operation 306 of FIG. 3.

The tree structure may be provided as a parameter with each call; it is only retained as a transient copy during change evaluation within the device. With each call, the device validates that the recreated tree-identifying hash matches the one it is expected to trust. The non-sensitive nature of the tree, the infeasibility of generating colliding hashes, and the implied immutability of hash-identified structures allow devices to trust even externally supplied transient copies.

The device evaluates the proposed change, and validates that the updated state hash calculated for the requested new state is present in the tree as one of the known-good states. This implies that the current state is also valid. Any other proposed change is rejected.

Exit from the multi-path state machine may be requested. Preferably, the device evaluates the proposed exit, and if it is marked as a valid exit point in the tree structure, the hash of the history-incorporating aggregate hash is removed, indicating that the device is now back in fully deterministic mode.

Upon state-machine termination, the system replaces the currently-stored state hash of the history-aggregated terminal state with a hash representing the final state. Preferably, the final history-incorporating aggregate hash is logged, if desired or as required.

Practical Example: Merkle [Hash] Trees

A particularly useful data structure, Merkle trees allow unambiguous, efficient encoding of an essentially unlimited number of hashes in a single, non-malleable hierarchical structure, denoted herein as MRK. In a preferred approach, the valid state and history-incorporating aggregate hashes are used as tree leaves, and the rest of the tree is constructed as any standard Merkle tree is typically constructed.

Note that, in preferred aspects, an addition to standard Merkle trees is added, to mark valid terminal states as special. This requires only minimal extensions to optionally add a bit per entry. This implementation detail would be trivial, and it is mentioned here only for completeness. Examples of special markings are presented below.

Exemplary Procedure to Represent Valid Before-after Pairs

Figure 4:
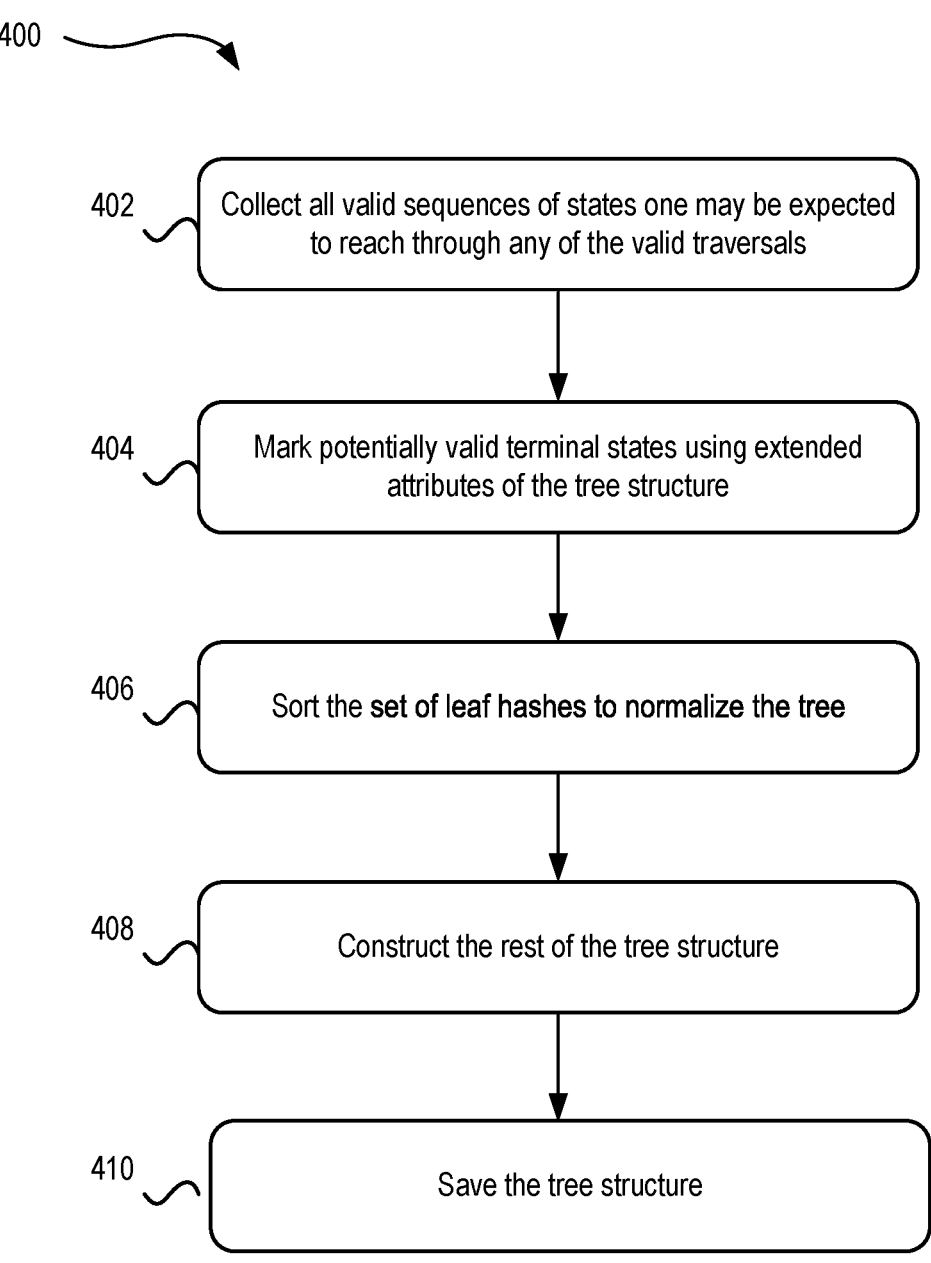
FIG. 4 is a flowchart of a method for representing valid before-after pairs of states, in accordance with one approach.

Now referring to FIG. 4, a flowchart of a method 400 for representing valid before-after pairs of states is shown according to one approach. The method 400 may be performed in accordance with the present invention in any of the environments depicted in FIGS. 1-3, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Assuming a hash-combining primitive has been selected, a simple exhaustive traversal of the valid state-machine advances forms all leaves of the tree structure. As shown in FIG. 4, method 400 may initiate with operation 402, where all valid sequences of states one may be expected to reach through any of the valid traversals are collected. The history-incorporating aggregate hashes of these sequences form leaf entries of the tree.

In operation 404, potentially valid terminal states are marked using extended attributes of the tree structure.

In operation 406, the set of leaf hashes is sorted to normalize the tree. This normalization ensures that identical state machines will be encoded as the same tree.

In operation 408, the rest of the tree structure is constructed, such as adding the higher-level hierarchical aggregating levels of the tree structure.

In operation 410, the tree structure is saved, and possibly published. The top-level identifying hash of the tree structure is published to allow matching expected functionality and the known hash which represents the state machine described by the tree structure.

Example: Controlled State Evolution Through a Priori Known Sequences

Valid Transition Sequences

Figure 5:
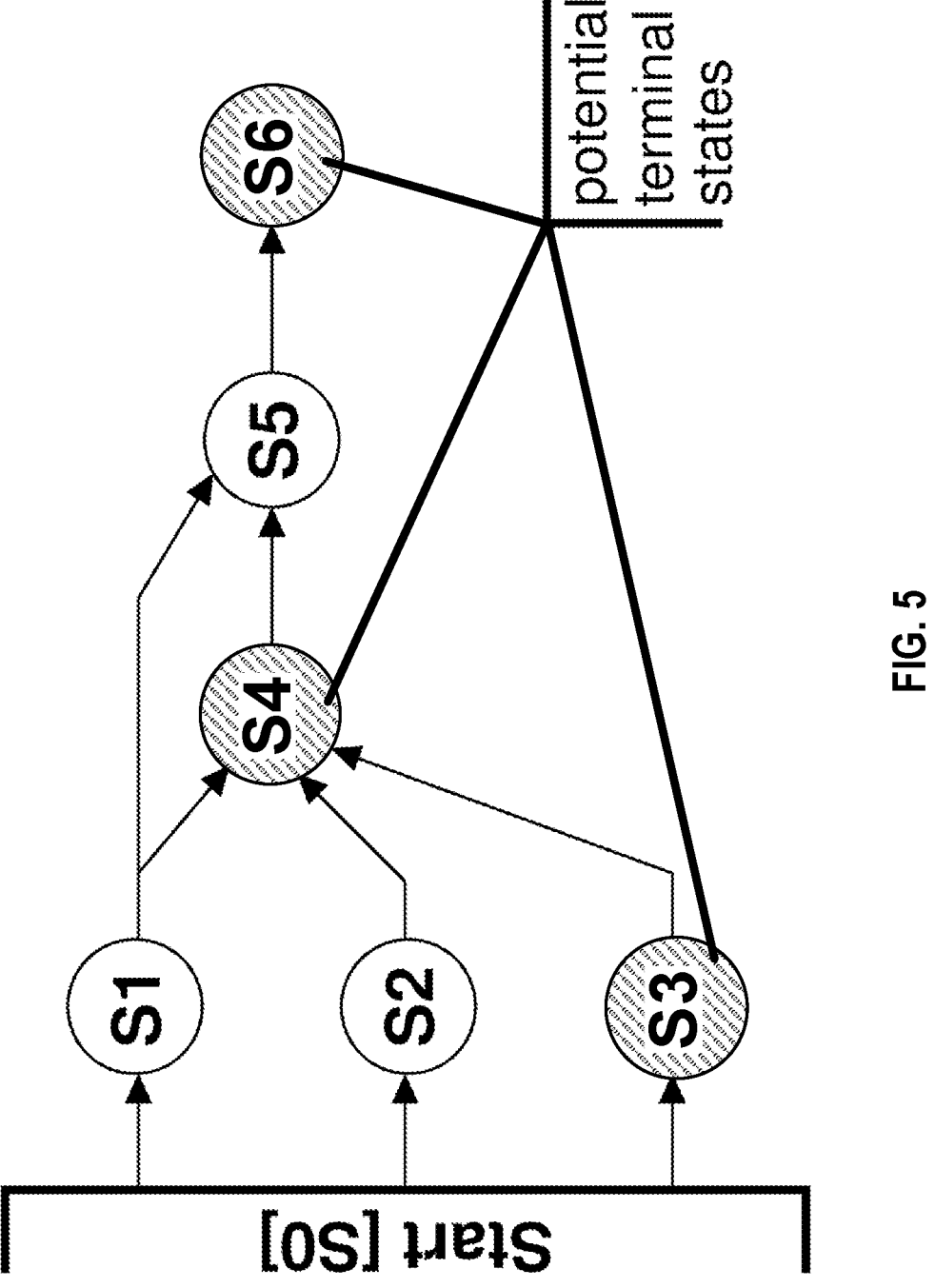
FIG. 5 is a chart representing a set of potentially valid sequences.

The following example is a contrived example with states S1 . . . S6 and start state S0. Any one of the following sequences are to be accepted as valid, with no other valid sequence. This set of potentially valid sequences is shown in FIG. 5.

| 1. | S0 -> S1 -> | | S4 -> S5 -> S6 |
|----|-------------|--------|----------------|
| 2. | S0 -> S1 -> | | S5 -> S6 |
| 3. | S0 -> | S2 -> | S4 |

-continued

| | | |
|---|---|---|
| 4. | S0 -> | S2 -> | S4- > S5 -> S6 |
| 5. | S0 -> | | S3 |
| 6. | S0 -> | | S3 -> S4 |
| 7. | S0 -> | | S3 -> S4 -> S5 -> S6 |

Note that S4 is a possibly valid terminal state (after S2), but it is not allowed to terminate right after S1->S4 sequence, which is intentionally missing from the list (and not an oversight).

Valid Before-after Transition State Pairs

Assume that a representation where H(X, Y) means initial state X and subsequent state Y, with TH ( . . . ) indicating a valid traversal-terminating transition. (Typically, the TH ( . . . ) function may be equivalent to H ( . . . ) with out-of-band attributes marking the result as a potentially terminating state.) The following list of hashes is the comprehensive list of correct final or intermediate states the illustrative system is expected to proceed through:

```
H(S0, S1)
H(H(S0, S1), S4)                                          (*)
H(H(H(S0, S1), S4), S5)
TH(H(H(H(S0, S1), S4), S5), S6)   -> term = S6   (4 steps)
H(H(S0, S1), S5)
TH(H(H(S0, S1), S5), S6)          -> term = S6   (3 steps)
H(S0, S2)
TH(H(S0, S2), S4)                 -> term = S4   (2 steps)   (*)
H(H(H(S0, S2), S4), S5)
TH(H(H(H(S0, S2), S4), S5), S6)   -> term = S6   (4 steps)
TH(S0, S3)                        -> term = S3   (1 step)
TH(H(S0, S3), S4)                 -> term = S4   (2 steps)   (*)
H(H(H(S0, S3), S4), S5)
TH(H(H(H(S0, S3), S4), S5), S6)   -> term = S6   (4 steps)
```

Assuming a start from S0, as long as both the current and the expected-next state hash is present in the above list, the system is in one of the correct states of FIG. 5.

The list of before-after hash pairs in this example also encodes the set of valid terminal states. Particularly, if a termination-indicating input is received at one of the TH ( . . . ) states, the set of valid sequences is left in an expected known-good condition. All other termination, just as entering a state not on the above list, amounts to an unintended, and therefore incorrect, transition. Note that the nested hash functions, which encode history, lead to different history-incorporating aggregate hashes if the same state may be reached through different paths. In the above list, the (*) entries all mark sequences reaching state S4, but since all pass through different paths, their states all differ (even if they all append the hash of S4 at that particular point).

Note that the path-dependent, different hashes enable differentiation of paths which may, and which may not, be terminal states from the same state (which happens to be the case for the three paths through S4 here, two of which are possibly terminating). However, when the final history-incorporating aggregate hash gets replaced by that of the final state, both of the different paths to terminal S4 would revert to the same S4 hash.

An Example with Real Hashes

SHA-256 is used to compute hashes in the present example, but the values are truncated to 32 bits each for readability. The first bit of the hash of tree leaf hashes is adjusted to indicate possibly-terminal-state of each value. The hash of a non-terminal state's first bit is forced to zero (leading hex digits 0 . . . 7); possibly-terminal state hashes' first bits are forced to one (leading hex digits 8 . . . f).

For this example, the ASCII representations of S0 . . . S6 are served as state-describing sample inputs; subsequent hash-append steps operate on a raw, big-endian binary representation of its inputs.

Figure 6:
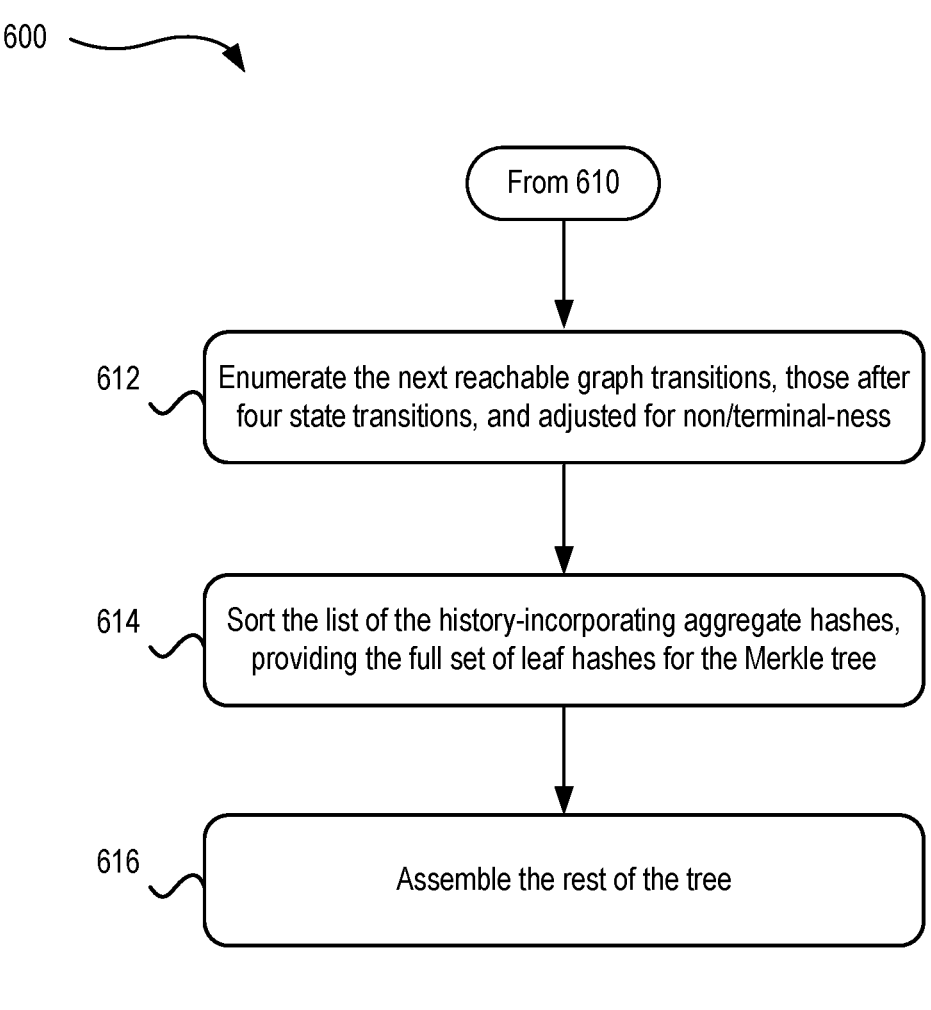
FIG. 6 is a flowchart of a method for creating a tree structure, in accordance with one approach.

Now referring to FIG. 6, a flowchart of an exemplary method 600 for creating the tree, according to one approach. The method 600 may be performed in accordance with the present invention in any of the environments depicted in FIGS. 1-5, among others, in various approaches. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various approaches, the method 600 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where SHA-256 (ASCII "S0") . . . SHA-256 (ASCII "S6") is calculated, and truncated to 32 bits. In operation 604, all values are adjusted to indicate a non-terminal state, forcing hash bits to zero (since none of the states themselves are terminal states). The result is as follows:

```
S0 -> Hash(original) = xf87980c8 -> Hash(marked) = x787980c8
S1 -> x3696ad59 -> x3696ad59
S2 -> x44d6a8a7 -> x44d6a8a7
S3 -> xadfa2b24 -> x2dfa2b24
S4 -> xb1d3eb8f -> x31d3eb8f
S5 -> x1cdcbd57 -> x1cdcbd57
S6 -> xb12f76a4 -> x312f76a4
```

In operation 606, the valid transition sequences are enumerated as they are reached in the graph, by appending and then hashing valid before-after states:

```
H(S0, S1) -> x0599d4cb from SHA-256(x787980c83696ad59) ==
x0599d4cb6bdc55c76...
H(S0, S2) -> x1cfa459d
TH(S0, S3) -> xfa44bbe3
```

The hashes may be adjusted: H(S0, S1) and H(S0, S2) are non-terminal, while H (S0, S3) is possibly terminal. In this case, by coincidence, the leading bits are already 0, 0, and 1, and the adjustment amounts to a no-operation (NOP).

In operation 608, the next reachable graph transitions (those after two state transitions) are enumerated. Hashes are adjusted for non/terminal-ness. Below, only the adjustments which change the first bit are shown:

```
H(H(S0, S1), S4) -> x78d5ee42
H(H(S0, S1), S5) -> xa6259078 -> x26259078
TH(H(S0, S2), S4) -> x42e34e53 -> xc2e34e53
H(H(S0, S3), S4) -> xc643af7c -> x4643af7c
```

In operation 610, the next reachable graph transitions, those after three state transitions, are enumerated, and adjusted for non/terminal-ness (e.g., marking only changes):

```
H(H(H(S0, S1), S4), S5) -> x59a25028
TH(H(H(S0, S1), S5), S6) -> x902100f2
H(H(H(S0, S2), S4), S5) -> x0c26a36d
H(H(H(S0, S3), S4), S5) -> x584b2876
```

Coincidentally, none of the terminal-state adjustments change values in this step.

In operation 612, the next reachable graph transitions, those after four state transitions, are enumerated, and adjusted for non/terminal-ness (marking only changes):

```
TH(H(H(H(S0, S1), S4), S5), S6) -> x26c3a40b -> xc6c3a40b
TH(H(H(H(S0, S2), S4), S5), S6) -> xc14e6ad8
TH(H(H(H(S0, S3), S4), S5), S6) -> x156cbd12 -> x956cbd12
```

In operation 614, the list of the above history-incorporating aggregate hashes (14 total) are sorted:

```
x0599d4cb from S0 -> S1
x0c26a36d            S0 -> S2 -> S4 -> S5
x1cfa459d            S0 -> S2
x26259078            S0 -> S1 -> S5
x4643af7c            S0 -> S3 -> S4
x584b2876            S0 -> S3 -> S4 -> S5
x59a25028            S0 -> S1 -> S4 -> S5
x78d5ee42            S0 -> S1 -> S4
x902100f2            S0 -> S1 -> S5 -> S6
x956cbd12            S0 -> S3 -> S4 -> S5 -> S6
xc14e6ad8            S0 -> S2 -> S4 -> S5 -> S6
xc2e34e53            S0 -> S2 -> S4
xc6c3a40b            S0 ->S1 -> S4 -> S5 -> S6
xfa44bbe3                                      S0 -> S3
```

In operation 616, the rest of the tree is assembled. Note that no terminal/non-terminal distinction is needed above the leaf hashes; therefore SHA-256 hashes can be applied as-is, without adjustments. The hashes may be combined to create history-incorporating aggregate hashes, e.g., x0599d4cb is hashed with x0c26a36d to obtain x6fa03fc4, which is hashed with xf2e315d7 to obtain x5d5e313b, and so on. The resulting tree structure is:

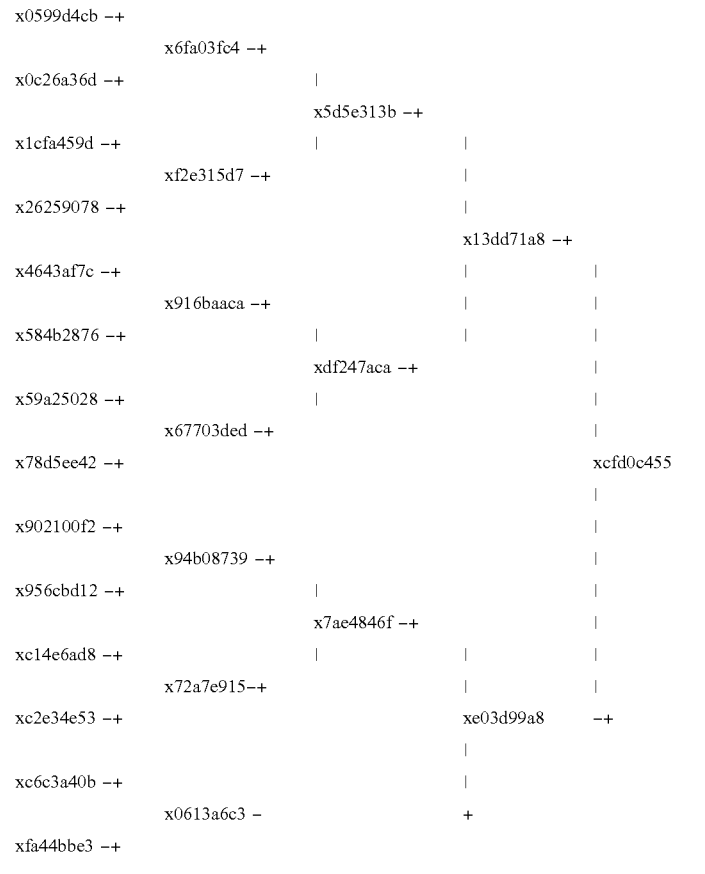

The top-level tree hash is xcfd0c455, which is a history-incorporating aggregate hash that is affected by all previous hashes. In the tree identified by this top-level hash, the set of leaf hashes in operation 614 unambiguously enumerate the fourteen permitted transitions, and the tree traversal from any of them leads to the top-level hash.

Figure 7:
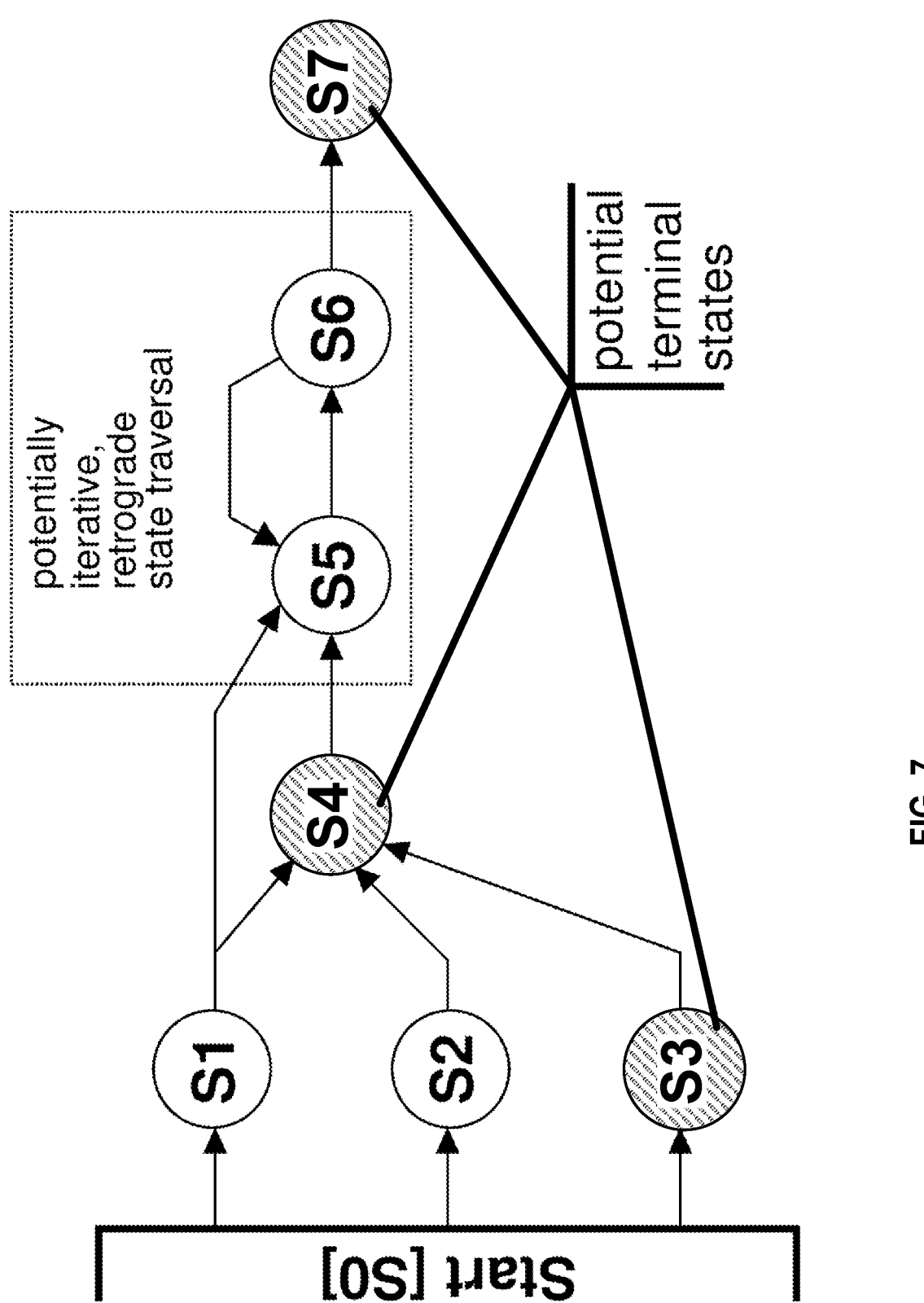
FIG. 7 is a chart representing a set of potentially valid sequences.

Finally, an extension of the example allows for an iterative, retrograde state reversal as a valid transition. For example, as shown in FIG. 7, a state transition from S6 back to S5 is a valid transition, and thus the Merkle tree would include a history-incorporating aggregate hash reflecting a transition from S5->S6, and likewise a history-incorporating aggregate hash transition from S6->S5.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:

in response to receiving a request to transition a system to a new state, requesting a set of history-incorporating aggregate hashes;

receiving the history-incorporating aggregate hashes;

evaluating whether to transition to the new state by:

calculating a hash for the requested new state, comparing the calculated hash to the received history-incorporating aggregate hashes, and allowing the transition to the new state in response to determining that the calculated hash matches one of the history-incorporating aggregate hashes, else not allowing the transition to the new state in response to determining that the calculated hash does not match one of the history-incorporating aggregate hashes; and storing a hash of a final state reached in response to execution in a state machine being terminated in the system.

2. The computer-implemented method of claim 1, wherein the history-incorporating aggregate hashes are received as a tree structure.

3. The computer-implemented method of claim 2, wherein the tree structure is only retained as a transient copy within the system.

4. The computer-implemented method of claim 2, wherein the system stores only a root of the tree structure persistently.

5. The computer-implemented method of claim 1, wherein the hash for the requested new state is generated using a hash for a current state.

6. The computer-implemented method of claim 1, comprising replacing, in a persistent register, a hash for a current state of the system with the calculated hash for the new state in response to transitioning to the new state.

7. The computer-implemented method of claim 1, wherein the calculated hash is stored in a hash-sized persistent register.

8. The computer-implemented method of claim 1, wherein the history-incorporating aggregate hashes are in a form of a Merkle tree, and comprising using at least a hash identifying a current state of the system to generate the calculated hash; and comparing the calculated hash to the Merkle tree to determine whether the requested state transition matches a valid state transition sequence of the Merkle tree.

9. The computer-implemented method of claim 1, wherein the history-incorporating aggregate hashes are created by determining known-good state sequences of the system, and enumerating valid paths for the determined known-good state sequences by constructing the history-incorporating aggregate hashes that represent the states along the paths.

10. The computer-implemented method of claim 9, wherein at least some the history-incorporating aggregate hashes are constructed by sequentially combining hashes for states along the respective paths.

11. A computer program product for verifying whether a state transition is allowed and/or valid, the computer program product comprising:

one or more computer readable storage media, and program instructions collectively stored on the one or more computer readable storage media, the program instructions comprising:

program instructions to perform the method of claim 10.

12. A system, comprising:

a processor; and logic integrated with the processor, executable by the processor, or integrated with and executable by the processor, the logic being configured to perform the method of claim 1.

13. A computer-implemented method, comprising:

in response to receiving a request to transition a system to a new state, requesting a set of history-incorporating aggregate hashes;

receiving the history-incorporating aggregate hashes; and evaluating whether to transition to the new state by:

calculating a hash for the requested new state, comparing the calculated hash to the received history-incorporating aggregate hashes, and allowing the transition to the new state in response to determining that the calculated hash matches one of the history-incorporating aggregate hashes, else not allowing the transition to the new state in response to determining that the calculated hash does not match one of the history-incorporating aggregate hashes;

replacing, in a persistent register, a hash for a current state of the system with the calculated hash for the new state in response to transitioning to the new state; and replacing the calculated hash with a hash of a final state reached in response to execution in a state machine being terminated in the system.

14. The computer-implemented method of claim 13, wherein the history-incorporating aggregate hashes are received as a tree structure.

15. The computer-implemented method of claim 13, wherein the hash for the requested new state is generated using a hash for a current state.

16. A computer-implemented method, comprising:

in response to receiving a request to transition a system to a new state, requesting a set of history-incorporating aggregate hashes;

receiving the history-incorporating aggregate hashes; and evaluating whether to transition to the new state by:

calculating a hash for the requested new state, wherein the hash for the requested new state is generated using a hash for a current state, comparing the calculated hash to the received history-incorporating aggregate hashes, and allowing the transition to the new state in response to determining that the calculated hash matches one of the history-incorporating aggregate hashes, else not allowing the transition to the new state in response to determining that the calculated hash does not match one of the history-incorporating aggregate hashes; and replacing, in a persistent register, a hash for a current state of the system with the calculated hash for the new state in response to transitioning to the new state; and replacing the calculated hash with a hash of a final state reached in response to execution in a state machine being terminated in the system.

17. The computer-implemented method of claim 16, wherein the history-incorporating aggregate hashes are received as a tree structure, wherein the tree structure is only retained as a transient copy within the system.

18. The computer-implemented method of claim 16, wherein the history-incorporating aggregate hashes are received as a tree structure, wherein the system stores only a root of the tree structure persistently.

* * * * *